(12) United States Patent
Chatterjee et al.

(10) Patent No.: US 12,450,932 B2
(45) Date of Patent: Oct. 21, 2025

(54) TEXT-BASED INFORMATION EXTRACTION FROM IMAGES

(71) Applicant: Dell Products L.P., Round Rock, TX (US)

(72) Inventors: Anamika Chatterjee, Kolkata (IN); Saurabh Jha, Austin, TX (US); Rohitashwa Chakraborty, Konnagar (IN)

(73) Assignee: Dell Products L.P., Round Rock, TX (US)

( * ) Notice: Subject to any disclaimer, the term of this patent is extended or adjusted under 35 U.S.C. 154(b) by 329 days.

(21) Appl. No.: 18/333,271

(22) Filed: Jun. 12, 2023

(65) Prior Publication Data
US 2024/0412543 A1 Dec. 12, 2024

(51) Int. Cl.
*G06V 30/00* (2022.01)
*G06V 10/82* (2022.01)
*G06V 30/146* (2022.01)
*G06V 30/16* (2022.01)
*G06V 30/19* (2022.01)

(52) U.S. Cl.
CPC ........ *G06V 30/19147* (2022.01); *G06V 10/82* (2022.01); *G06V 30/1475* (2022.01); *G06V 30/1607* (2022.01); *G06V 30/19173* (2022.01)

(58) Field of Classification Search
CPC ............. G06V 30/19147; G06V 10/82; G06V 30/1475; G06V 30/1607; G06V 30/19173
See application file for complete search history.

(56) References Cited

U.S. PATENT DOCUMENTS

| 2022/0156300 A1* | 5/2022 | Paruchuri | ............ G06V 30/416 |
| 2024/0282094 A1* | 8/2024 | Tsimpoukelli | ......... G06V 10/80 |

OTHER PUBLICATIONS

Liao et al, Rotation-Sensitive Regression for Oriented Scene Text Detection, IEEE/CVF Conference on Computer Vision and Pattern Recognition (Year: 2018).*

* cited by examiner

*Primary Examiner* — Xiao Liu
(74) *Attorney, Agent, or Firm* — Chamberlain, Hrdlicka, White, Williams & Aughtry; Aly Z. Dossa (57) ABSTRACT

A method for extracting text information from images includes obtaining an extraction request associated with live data comprising an image; generating, using a prediction model, rotational variant features and rotational invariant features associated with the live data; generating, using the prediction model, text embeddings associated with the rotational variant features using overlapping kernel-based embedding on the live data; generating, using the prediction model, attention values for each pixel in the live data using context attention; applying a trained language model to the text embeddings, attention values, and the live data to generate predictions; and performing extraction actions based on the predictions.

20 Claims, 7 Drawing Sheets

TEXT-BASED INFORMATION EXTRACTION FROM IMAGES

BACKGROUND

Computing devices may provide services. To provide the services, the computing devices may require data. The data may be included in images. To perform or otherwise improve the services, the data may be extracted from the images.

SUMMARY

In general, certain embodiments described herein relate to a method for extracting text information from images. The method may include obtaining an extraction request associated with live data comprising an image; generating, using a prediction model, rotational variant features and rotational invariant features associated with the live data; generating, using the prediction model, text embeddings associated with the rotational variant features using overlapping kernel-based embedding on the live data; generating, using the prediction model, attention values for each pixel in the live data using context attention; applying a trained language model to the text embeddings, attention values, and the live data to generate predictions; and performing extraction actions based on the predictions.

In general, certain embodiments described herein relate to a system for extracting text information from images. The system includes a persistent storage for storing raw training data and processed training data. The system also includes an extraction system that includes a processor and memory and is programmed to obtain an extraction request associated with live data comprising an image; generate, using a prediction model, rotational variant features and rotational invariant features associated with the live data; generate, using the prediction model, text embeddings associated with the rotational variant features using overlapping kernel-based embedding on the live data; generate, using the prediction model, attention values for each pixel in the live data using context attention; apply a trained language model to the text embeddings, attention values, and the live data to generate predictions; and perform extraction actions based on the predictions.

In general, certain embodiments described herein relate to a non-transitory computer readable medium that includes computer readable program code, which when executed by a computer processor enables the computer processor to perform a method for extracting text information from images. The method may include obtaining an extraction request associated with live data comprising an image; generating, using a prediction model, rotational variant features and rotational invariant features associated with the live data; generating, using the prediction model, text embeddings associated with the rotational variant features using overlapping kernel-based embedding on the live data; generating, using the prediction model, attention values for each pixel in the live data using context attention; applying a trained language model to the text embeddings, attention values, and the live data to generate predictions; and performing extraction actions based on the predictions.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Specific embodiments will now be described with reference to the accompanying figures. In the following description, numerous details are set forth as examples of the embodiments disclosed herein. It will be understood by those skilled in the art that one or more embodiments of the present disclosure may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments disclosed herein relate to systems, non-transitory computer readable mediums, and methods for extracting text information from images.

Order processing is one of the key elements in the order-to-cash cycle for all commercial businesses. At this step, customer order requirements from documents such as purchase orders may be captured for booking the orders. Agents (e.g., employees) may manually match purchase order (PO) information against company quotation information before converting the quote into an order. To process a single order, it may take 10 to 12 minutes. This amount of time may be referred to as the average handling time (AHT). Ensuring correct information in an order may be critical, otherwise it may lead to downstream frictions due to the wrong product getting shipped, wrong billing & shipping address selection, pricing error, etc.

There may be information that can be extracted from unstructured scanned documents with intrinsic layout information. Additionally, these documents may be skewed with a lot of noise, making it difficult for humans to read & process them which significantly adds to the overall AHT.

It may be very challenging to detect and extract words from image documents. Additionally, using these types of documents for artificial intelligence (AI) models for various tasks may be challenging because image-based data cannot be used directly for AI models which require text of these images as input. Embodiments disclosed herein may create a pipeline for preparing image-based documents to feed into AI models & develop an efficient text detection with recognition method. There may be many unstructured documents that include images specifying information, and all of the images may be skewed and include a significant amount of noise (e.g., blurry pixels, distortions, random variations of brightness and/or color, etc.). Typical solutions for these scenarios rely on human evaluation and assessment of the documents.

Embodiments disclosed herein relate to leveraging artificial intelligence algorithms to overcome the challenges posed by unstructured image data and improve efficiency by automating end-to-end information extraction from images of documents such as purchase orders to automate the order booking process. Embodiments disclosed herein may address, at least in part, the following challenges: (i) automating the data preparation pipeline of 'scanned' documents in the presence of 'noise' and varying 'orientation', (ii) extracting coordinates of texts from image, and (iii) converting the images into editable texts.

Embodiments disclosed herein may: (i) use overlapping kernel based embedding instead of patched embedding to generate richer tokens which are better at preserving relationship between patches, (ii) use memory efficient Multi-head Context Attention in customized neural network architecture to speed-up the training process with limited data and reduced model size, (iii) use uniform scaling of all dimensions (network width, depth, and resolution) of the CNN based text detection model to achieve better accuracy and efficiency, and (iv) detecting complicated scene text images such as arbitrarily-oriented, curved, or deformed images using rotation sensitive regression. The embodiments disclosed herein are described in more detail below.

Figure 1:
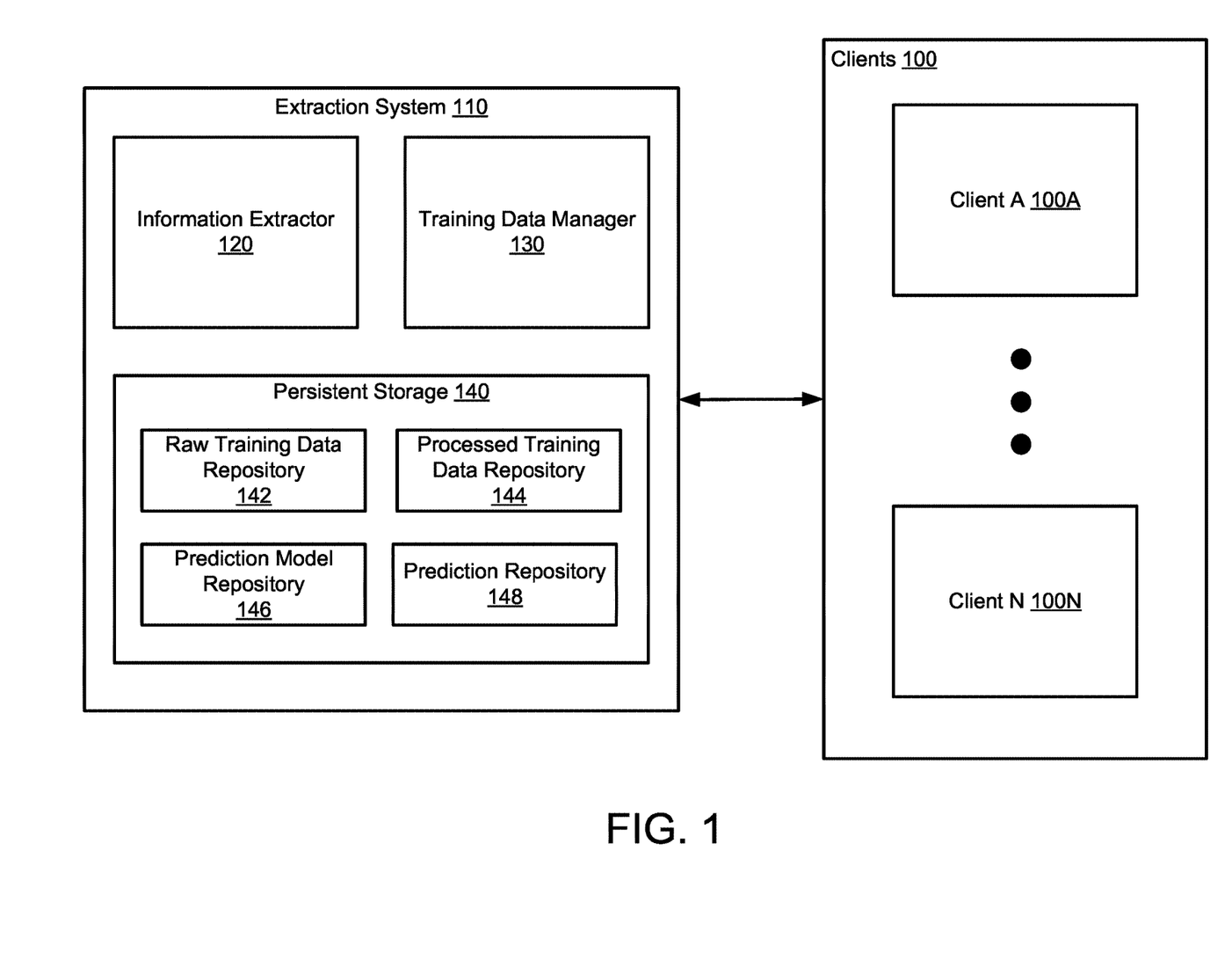
FIG. 1 shows a diagram of a system in accordance with one or more embodiments disclosed herein.

FIG. 1 shows a diagram of a system in accordance with one or more embodiments disclosed herein. The system may include clients (100) that obtain information extraction services from an extraction system (110). The information extraction services may include generating text extraction predictions for images for the clients (100) that indicate text included in the images. The information extraction services may further include initiating actions for the clients (100) based on the text extraction predictions. By utilizing such services, text data included in images that may be relevant to the clients (100) may be efficiently extracted and used for further processing.

Prior to generating text extraction predictions, the extraction system (110) may use a training data manager (130) to obtain training data (i.e., raw training data) associated with the clients (100), store the training data in the persistent storage (140) of the extraction system (110), and may enable the information extractor (120) to access the training data. The information extractor (120) may use the training data to generate prediction models that may also be stored in persistent storage (140). The information extractor (120) may generate any number of prediction models without departing from embodiments disclosed herein. The generated predictions may specify the text and the position of the text included in an image.

The components of the system illustrated in FIG. 1 may be operatively connected to each other and/or operatively connected to other entities (not shown) via any combination of wired (e.g., Ethernet) and/or wireless networks (e.g., Wide Area Networks (WANs), Local Area Networks (LANs), Internet, etc.). Each component of the system illustrated in FIG. 1 is discussed below.

The clients (100) may be implemented using one or more computing devices. A computing device may be, for example, a mobile phone, tablet computer, laptop computer, desktop computer, server, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3D. The clients (100) may be implemented using other types of computing devices without departing from embodiments disclosed herein. For additional details regarding computing devices, refer to FIG. 4.

The clients (100) may be implemented using logical devices without departing from embodiments disclosed herein. For example, the clients (100) may include virtual machines that utilize computing resources of any number of physical computing devices to provide the functionality of the clients (100). The clients (100) may be implemented using other types of logical devices without departing from the embodiments disclosed herein.

In one or more embodiments disclosed herein, the clients (100) include the functionality to provide computer implemented services to users. The computer implemented services may include, for example, purchase order processing services, database services, and/or any other computer implemented services without departing from embodiments disclosed herein. Obtaining text prediction services from the extraction system (110) may enable clients (100) to improve the efficiency and reliability of performing computer implemented services using the generated text predictions and the corresponding images.

To use the text prediction services, the clients (100) may perform actions under the directions of the extraction system (110). By doing so, the extraction system (110) may orchestrate the transmission of data and actions between the extraction system (110) and the clients (100). The extraction system (110) may also initiate an action(s) for the client (100) based on the generated text predictions.

A system in accordance with one or more embodiments disclosed herein may include any number of clients (e.g., 100A, 100N) without departing from embodiments disclosed herein. For example, a system may include a single client (e.g., 100A) or multiple clients (e.g., 100A, 100N).

In one or more embodiments disclosed herein, the extraction system (110) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 3A-3D. The extraction system (110) may be implemented using other types of computing devices without departing from embodiments disclosed herein. For additional details regarding computing devices, refer to FIG. 4.

The extraction system (110) may be implemented using logical devices without departing from the embodiments disclosed herein. For example, the extraction system (110) may include virtual machines that utilize computing resources of any number of physical computing devices to provide the functionality of the extraction system (110). The extraction system (110) may be implemented using other types of logical devices without departing from embodiments disclosed herein.

In one or more embodiments disclosed herein, the extraction system (110) may include the functionality to provide text information extraction services. Text information extraction services may include (i) generation of prediction models (146), (ii) generation of text information predictions for text included in images for clients (100), and/or (iii) initiating actions based on the predictions. By doing so, the extraction system (110) may improve the efficiency of extracting text-based information from images for image processing. The extraction system (110) may include the functionality to provide other and/or additional services without departing from embodiments disclosed herein.

In one or more embodiments disclosed herein, the information extractor (120) may be implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the information extractor (120) described through this application and all, or a portion, of the methods illustrated in FIGS. 3A-3D. The information extractor (120) may be implemented using other types of computing devices without departing from the embodiments disclosed herein. For additional details regarding computing devices, refer to FIG. 4.

In one or more embodiments disclosed herein, the information extractor (120) may be implemented as a physical device of the extraction system (110). The physical device may include circuitry. The physical device may be, for example, a field-programmable gate array, application specific integrated circuit, programmable processor, microcontroller, digital signal processor, or other hardware processor. The physical device may be configured to provide the functionality of the information extractor (120) described throughout this Detailed Description.

In one or more embodiments disclosed herein, the information extractor (120) may be implemented as computer instructions, e.g., computer code, stored on a storage that when executed by a processor of the extraction system (110) causes the extraction system (110) to provide the functionality of the information extractor (120) described throughout this Detailed Description.

In one or more embodiments disclosed herein, the information extractor (120) may include the functionality to provide information extraction services. The information extraction services may include (i) generating prediction models, (ii) generating processed training data using raw training data, and (iii) generating text predictions. The information extractor (120) may include the functionality to provide other and/or additional services without departing from embodiments disclosed herein. For additional details regarding the information extractor (120), refer to FIG. 2.

In one or more embodiments disclosed herein, the training data manager (130) may be implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) causes the computing device to provide the functionality of the training data manager (130) described through this application. The training data manager (130) may be implemented using other types of computing devices without departing from the embodiments disclosed herein. For additional details regarding computing devices, refer to FIG. 4.

In one or more embodiments disclosed herein, the training data manager (130) may be implemented as a physical device of the extraction system (110). The physical device may include circuitry. The physical device may be, for example, a field-programmable gate array, application specific integrated circuit, programmable processor, microcontroller, digital signal processor, or other hardware processor. The physical device may be configured to provide the functionality of the training data manager (130) described throughout this Detailed Description.

In one or more embodiments disclosed herein, the training data manager (130) may be implemented as computer instructions, e.g., computer code, stored on a storage that when executed by a processor of the extraction system (110) causes the extraction system (110) to provide the functionality of the training data manager (130) described throughout this Detailed Description.

In one or more embodiments disclosed herein, the training data manager (130) may be programmed to, or otherwise configured to, include the functionality to provide training data management services. Providing training data management services may include obtaining training data from the clients (100) and/or other entities (e.g., third-party entities not shown) and enabling the information extractor (120) to access the obtained training data. The training data manager (130) may include the functionality provide other and/or additional services without departing from embodiments disclosed herein.

In one or more embodiments disclosed herein, the persistent storage (140) may be implemented using a storage device. The storage device may be implemented using physical storage devices and/or logical storage devices. The persistent storage (140) may be implemented using other types of devices that provide data storage services without departing from the embodiments disclosed herein.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as, for example, hard disk drives, solid state drives, tape drives, and/or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments disclosed herein, the persistent storage (140) may be programmed to, or otherwise configured to, include the functionality to provide data storage services to the extraction system (110), the information extractor (120), the training data manager (130), and/or other entities. The data storage services may include storing of data and providing of previous stored data. The persistent storage (140) may include the functionality to provide other and/or additional services without departing from embodiments disclosed herein.

The persistent storage (140) may store data structures including a raw training data repository (142), a processed training data repository (144), a prediction model repository (146), and a prediction repository (148). Each of these data structures is discussed below.

The raw training data repository (142) may be one or more data structures that may include data generated and/or obtained by the clients (100), maintained by the training data manager (130), and utilized by the information extractor (120). The raw training data repository (142) may include any quantity of data. The data may include images that include textual information. The raw training data may include one or more training data sets for performing one or more training epochs to generate the prediction model. Each training data set may include image files. The image files may include common image file formats such as Joint Photographic Experts Group (JPEG) files, Portable Network Graphics (PNG) files, and/or Tagged Image File (TIFF) files and Portable Document Format (PDF) files that include images. Each image file in the raw training data may include images of documents (e.g., purchase orders, invoices, etc.) that may include one or more lines of text and corresponding truth labels (discussed below).

The processed training data repository (144) may be one or more data structures that may include processed training data generated by the information extractor (120). Processed training data may be raw training data that has been generated through one or more preprocessing operations performed by the information extractor. The processed training data repository (144) may be used by the information extractor to generate prediction models. The processed training data repository may include other and/or additional data and/or information without departing from embodiments disclosed herein. For additional details regarding the generation of processed training data included in the processed training data repository (144), refer to FIG. 3B.

The prediction model repository (146) may be one or more data structures that represent any number of prediction models for feature extraction predictions that may be generated by the information extractor (120) and utilized by the extraction system (110) to generate text predictions for images. The prediction models (146) may be, for example, convolutional neural networks (CNNs) generated by applying the processed training data to a baseline convolutional neural network or previously generated convolutional neural network and updating model parameters through training. Other convolutional neural network generation algorithms may be used to generate the prediction models (146) without departing from embodiments disclosed herein. In one or more embodiments, the prediction model repository (146) may include a trained language extraction model that may be used to generate text predictions using the extracted feature predictions generated using the prediction model. The trained extraction model may include any appropriate natural language processing model without departing from embodiments disclosed herein. The prediction model repository (146) may include other and/or additional information without departing from embodiments disclosed herein.

The prediction repository (148) may be one or more data structures that include predictions generated by the prediction models (146). The prediction repository (148) may store any number of generated predictions. The predictions may include features extracted using the prediction model (e.g., rotation variant features, rotation invariant features, text embeddings, attention values, etc.) and text predictions. The text predictions may include a predicted bounded box that specify the coordinates of a line of text in an image and the corresponding predicted text values included in that line of text. The text values may include the predicted alphanumeric characters that make up the line of text. The prediction repository (148) may include other and/or additional information without departing from embodiments disclosed herein.

While the data structures (e.g., 142, 144, 146, 148) are illustrated as separate data structures and have been discussed as including a limited amount of specific information, any of the aforementioned data structures or data structures discussed below may be divided into any number of data structures, combined with any number of other data structures, and may include additional, less, and/or different information without departing from the embodiments disclosed herein. Additionally, while illustrated as being stored in the persistent storage (140), any of the aforementioned data structures may be stored in different locations (e.g., in persistent storage of other computing devices) and/or spanned across any number of computing devices without departing from the embodiments disclosed herein. Moreover, the data structures discussed herein may be implemented using, for example, lists, linked lists, tables, unstructured data, databases, etc.

Figure 2:
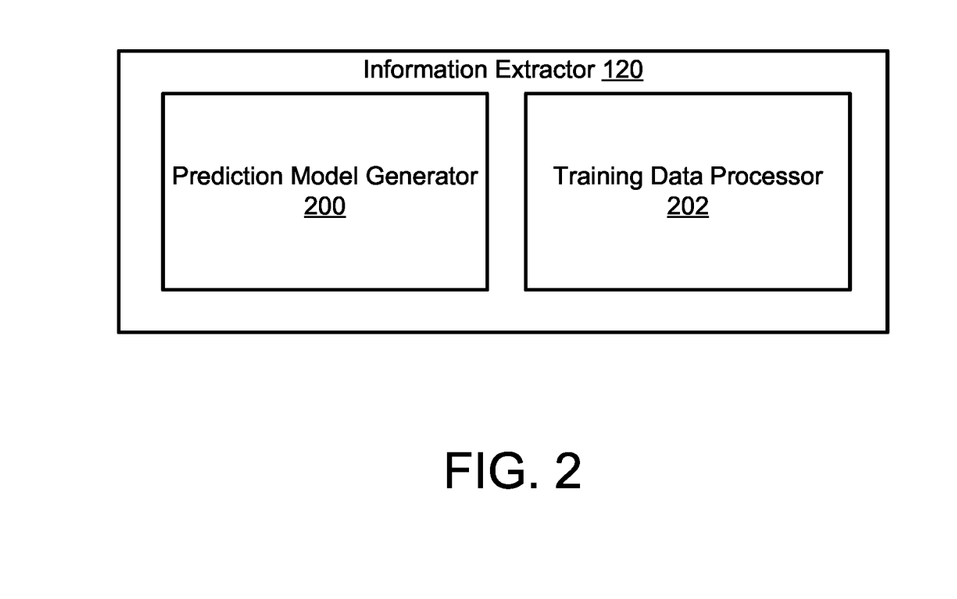
FIG. 2 shows a diagram of an information extractor in accordance with one or more embodiments disclosed herein.

FIG. 2 shows a diagram of an information extractor in accordance with one or more embodiments disclosed herein. The information extractor (120) may be similar to the one shown in FIG. 1. As discussed above, the information extractor (120) may provide information extraction services for the extraction system (110, FIG. 1).

To provide the aforementioned functionality of the information extractor (120), the information extractor (120) may include a prediction model generator (200) and a training data processor (202). Each component of the information extractor (120) is discussed below.

The prediction model generator (200) may be programmed to, or otherwise configured to, provide prediction model generation services and text prediction generation services using live data for the information extractor (120). The prediction model generation services and the text prediction generation services may include performing the methods of FIGS. 3A-3D. The prediction model generator (200) may include other and/or additional functionalities without departing from embodiments disclosed herein.

In one or more embodiments disclosed herein, the prediction model generator (200) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the prediction model generator (200) described throughout this application and/or all or a portion of the methods illustrated in FIGS. 3A-3D. The prediction model generator (200) may be some other physical device without departing from embodiments disclosed herein.

The prediction model generator (200) may be implemented using computer instructions (e.g., computing code) stored on a persistent storage (e.g., 140, FIG. 1) that when executed by a processor of the information extractor (120) causes the information extractor (120) to perform the functionality of the prediction model generator (200) described throughout this application and/or all or a portion of the methods illustrated in FIGS. 3A-3D.

In one or more embodiments disclosed herein, the training data processor (202) provides training data processing services for the information extractor (120). The training data processing services may include performing all or a portion of the methods of FIG. 3B. The training data processor (202) may provide other and/or additional services to the information extractor (120) and/or other entities without departing from embodiments disclosed herein.

In one or more embodiments disclosed herein, the training data processor (202) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the training data processor (202) described throughout this application and/or all or a portion of the methods illustrated in FIG. 3B. The training data processor (202) may include other types of physical devices without departing from embodiments disclosed herein.

Figure 3A:
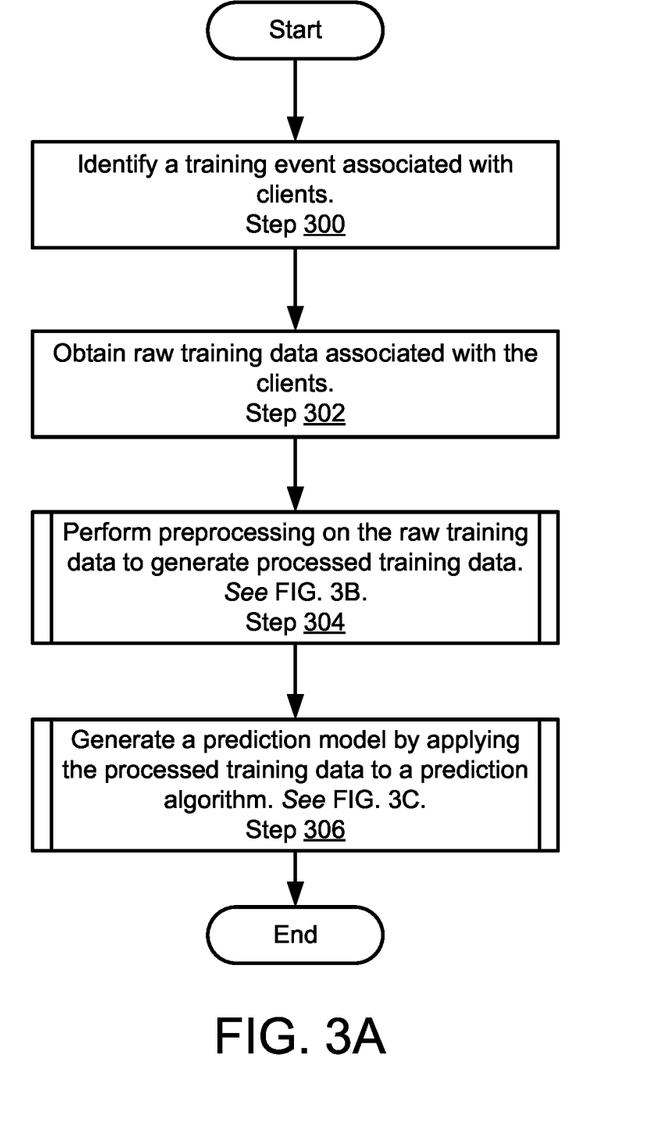
FIG. 3A shows a flowchart of a method of generating a prediction model in accordance with one or more embodiments disclosed herein.
Figure 3B:
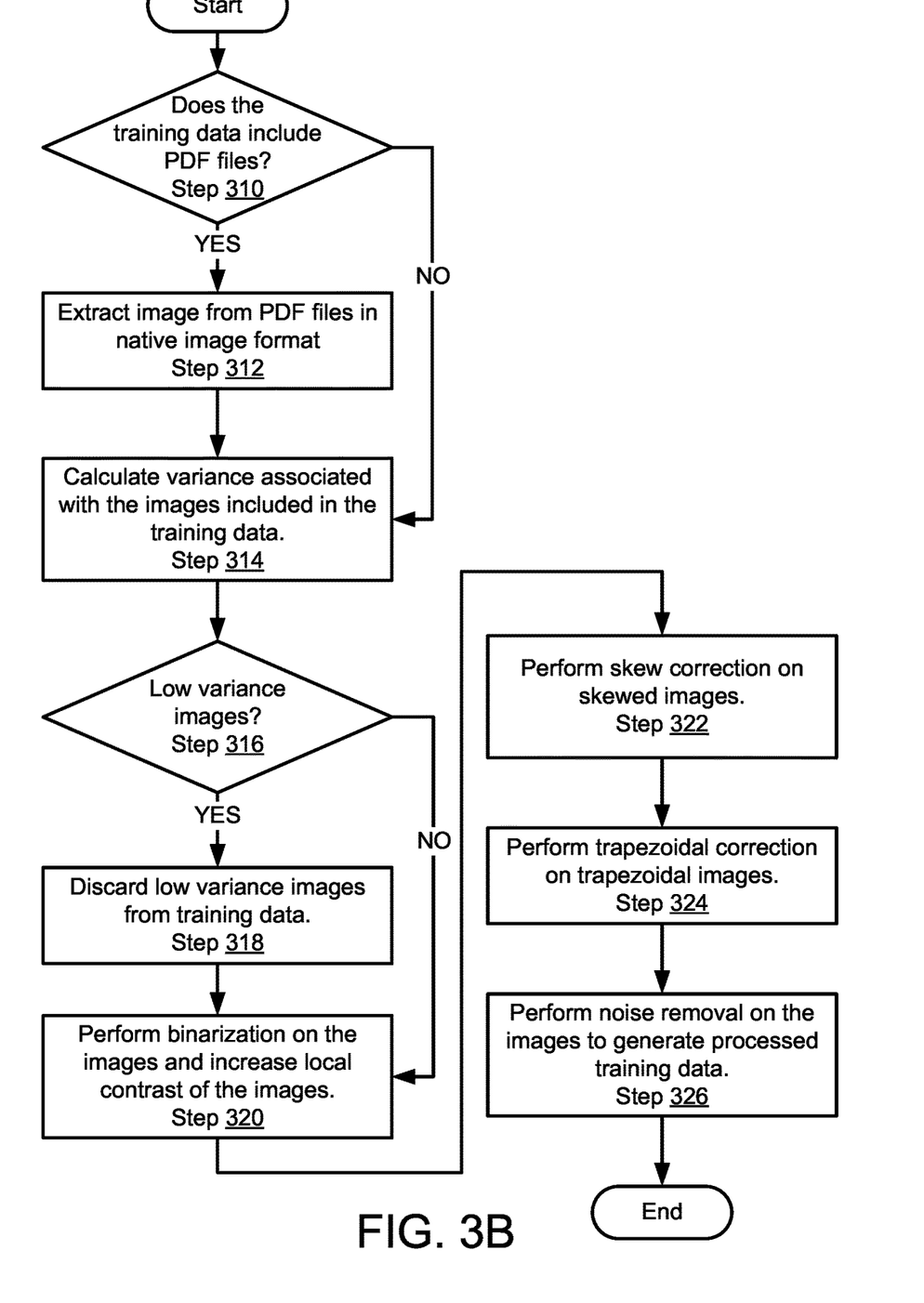
FIG. 3B shows a flowchart of a method for generating processed training data in accordance with one or more embodiments disclosed herein.

The training data processor (202) may be implemented using computer instructions (e.g. computer code) stored on a persistent storage that when executed by a processor of the information extractor (120) causes the information extractor (120) to provide the functionality of the training data processor (202) described throughout this application and/or all or a portion of the methods illustrated in FIG. 3B.

While the information extractor (120) of FIG. 2 has been described and illustrated as including a limited number of components for the sake of brevity, an information extractor (120) in accordance with embodiments disclosed herein may include additional, fewer, and/or different components than those illustrated in FIG. 2 without departing from the embodiments disclosed herein.

FIG. 3A shows a flowchart of a method of generating a prediction model in accordance with one or more embodiments disclosed herein. The method may be performed by, for example, the extraction system (110, FIG. 1). Other and/or additional components of the system illustrated in FIG. 1 may perform all, or a portion, of the method of FIG. 3A without departing from embodiments disclosed herein.

While FIG. 3A is illustrated as a series of steps, any of the steps may be omitted, performed in a different order, additional steps may be included, and/or any or all of the steps may be performed in a parallel and/or partially overlapping manner without departing from embodiments disclosed herein.

In step 300, a training event associated with clients is identified.

In one or more embodiments disclosed herein, the information extractor of the extraction system may obtain a message from a client. A user of the client may generate the message to send to the information extractor. The message may include a request to generate a prediction model. The prediction model may be a first prediction model generated by the extraction system, or in another embodiment disclosed herein, the prediction model may be a subsequent prediction model that may include improved prediction services than the previously generated prediction model. A client may periodically send messages that include requests to generate prediction models in order to improve the text prediction services over time. The message may include the client identifiers that may specify the clients associated with the message. The information extractor may identify obtaining the message as identifying the training event associated with the clients without departing from embodiments disclosed herein. The message may specify the generation of an initial prediction model or the generation of a prediction model to improve the performance of the prediction services of an existing prediction model. The training event associated with the clients may be identified via other and/or additional methods without departing from embodiments disclosed herein.

In step 302, raw training data associated with the clients is obtained.

In one or more embodiments disclosed herein, the training data manager of the extraction system may send a message to the clients associated with the training event. The training data manager may identify the clients based on the client identifiers obtained in step 300. The message may include a request to obtain the raw training data from the clients. In response to obtaining the message, the clients may generate the raw training data, or obtain the previously generated raw training data not used to generate a previous prediction model from persistent storage of the clients or other entities not shown in the system of FIG. 1. After generating and/or obtaining the raw training data, the clients send a message to the extraction system. The message may include the raw training data. In yet another embodiment disclosed herein, the training data manager may obtain the training data from a third-party entity (not shown in the system of FIG. 1). After obtaining the raw training data, the training data manager may store the raw training data in the raw training data repository. The raw training data associated with the clients may be obtained via other and/or additional methods without departing from embodiments disclosed herein.

In step 304, preprocessing is performed on the raw training data to generate processed training data.

In one or more embodiments disclosed herein, the information extractor of the extraction system may transform the raw training data into the processed training data. The raw training data may be in a form which may not be compatible with the prediction model generation algorithm used to generate the prediction models or may be inefficient to apply to the prediction model generation algorithm. The information extractor may generate the processed training data via the methods discussed below in FIG. 3B. For additional information regarding performing preprocessing on the raw training data to generate processed training data, refer to FIG. 3B.

In step 306, a prediction model is generated by applying the processed training data to a prediction algorithm.

In one or more embodiments disclosed herein, the information extractor may apply the processed training data to a prediction model generation algorithm to generate the prediction model. The prediction model generation algorithm may include the methods discussed below in FIG. 3C. For additional information regarding generating the prediction model, refer to FIG. 3C.

In one or more embodiments disclosed herein, the method may end following step 306.

FIG. 3B shows a flowchart of a method for generating processed training data in accordance with one or more embodiments disclosed herein. The method may be performed by, for example, the extraction system (110, FIG. 1). Other and/or components of the system illustrated in FIG. 1 may perform all, or a portion, of the method of FIG. 3B without departing from embodiments disclosed herein.

While FIG. 3B is illustrated as a series of steps, any of the steps may be omitted, performed in a different order, additional steps may be included, and/or any or all of the steps may be performed in a parallel and/or partially overlapping manner without departing from embodiments disclosed herein.

In step 310, a determination is made as to whether the raw training data include PDF files.

In one or more embodiments disclosed herein, the information extractor of the extraction system may check each file included in the raw training data to determine whether the raw training data includes PDF files. As discussed above, the raw training data may include image files in common image file formats such as Joint Photographic Experts Group (JPEG) files, Portable Network Graphics (PNG) files, and/or Tagged Image File (TIFF) files. The raw training data may include other and/or additional common image file formats without departing from embodiments disclosed herein. In addition to these common image file formats, the raw training data may also include PDF files that include images (e.g., scanned documents converted to PDF). The training data processor of the information extractor may check each file for metadata that may indicate the type or format of image file. The file metadata may include, for example, a filename extension, a file content type, and/or other indicators of the file type or format without departing from embodiments disclosed herein. In one or more embodiments disclosed herein, if a file includes a file metadata indicator associated with PDF files, then the training data processor may determine that the raw training data includes PDF files. In one or more embodiments disclosed herein, if no file includes a file metadata indicator associated with PDF files, then the training data processor may determine that the raw training data does not include PDF files. The determination as to whether the raw training data includes PDF files may be made via other and/or additional methods without departing from embodiments disclosed herein.

In one or more embodiments disclosed herein, if it is determined that the raw training data includes PDF files, then the method may proceed to step 312. In one or more embodiments disclosed herein, if it is determined that the raw training data does not include PDF files, then the method may proceed to step 314.

In step 312, images are extracted from the PDF files in the native image format of the images.

In one or more embodiments disclosed herein, the training data processor of the information extractor may extract images from the one or more PDF files included in the raw training data in the native image format of the images. In one or more embodiments, the PDF files may include metadata that may specify the original or native format of the image included in the PDF files. The file metadata may include, for example, a filename extension, a file content type, and/or other indicators of the file type or format of the images included in the PDF files without departing from embodiments disclosed herein. The training data processor may determine the image file format associated with each image included in the PDF files. The training data processor may then use a PDF converter or image extractor to convert or otherwise extract the images from the PDF files in the images' native file format. The training data processor may use any appropriate image extraction or PDF converter technique without departing from embodiments disclosed herein. The images may be extracted from the PDF files in the native image format of the images via other and/or additional methods without departing from embodiments disclosed herein.

In step 314, the variance associated with the images included in the raw training data is calculated.

In one or more embodiments disclosed herein, the training data processor of the information extractor may generate variances associated with the images included in the image files. The training data processor may use any appropriate method for calculating variance without departing from embodiments disclosed herein. For example, the training data processor may use the Laplacian, which measures the second derivative of an image, to calculate the average variance of the edges in an image. The Laplacian may specify regions of an image that include rapid intensity changes. The variance associated with the images may be calculated via other and/or additional methods without departing from embodiments disclosed herein.

In step 316, a determination is made as to whether the training data includes low variance images.

In one or more embodiments disclosed herein, the training data processor of the information extractor may determine whether the training data includes low variance images using the variances associated with the images and the a low variance threshold. In one or more embodiments, the low variance threshold may specify a variance value below which constitutes a low variance value. The training data processor may compare the variance of each image in the training data with the low variance threshold. In one or more embodiments disclosed herein, if an image is associated with a variance value that is below the low variance threshold, then the training data processor may determine that the training data includes low variance images. In one or more embodiments disclosed herein, if no image is associated with a variance value that is below the low variance threshold, then the training data processor may determine that the training data does not include low variance images. The determination as to whether the training data includes low variance images may be made via other and/or additional methods without departing from embodiments disclosed herein.

In one or more embodiments disclosed herein, if it is determined that the raw training data includes low variance images, then the method may proceed to step 318. In one or more embodiments disclosed herein, if it is determined that the raw training data does not include low variance images, then the method may proceed to step 320. In step 318, the low variance images are discarded from the training data.

In one or more embodiments disclosed herein, the training data processor of the information extractor may discard the low variance images. The training data processor may remove, delete, or otherwise discard the low variance images from the training data. By discarding low quality data, the training data processor may implement a quality check on the images included in the training data. The lower the quality of the image, the less likely that the image extractor may be able to use the image to generate text predictions. The higher the quality of the image, the higher the accuracy of the text predictions may be. There may be no practical use of including low quality images that will yield low quality results. If an image includes a high variance, then there may be a wide spread of responses, both edge-like and non-edge like, representative of a normal, in-focus image. But if there is very low variance (e.g., a variance below the low variance threshold), then there may be a tiny spread of responses in the corresponding image, indicating there are very little edges in the image. The more an image is blurred, the less edges there may be. The low variance images may be discarded from the training data via other and/or additional methods without departing from embodiments disclosed herein.

In step 320, a binarization is performed on the images and the local contrast of the images is increased.

In one or more embodiments disclosed herein, the training data processor of the information extractor may perform binarization on each image in the training data. Binarization may refer to the process of converting a colored image into an image that includes only black and white pixels. For example, pixels may be set to a black pixel value or a white pixel value based on pixel threshold values. Binarization may be performed locally over many small portions of the image, with each portion using varying thresholds for assigning black pixel values or white pixel values in order to generate a smooth transition between black and white pixels. Additionally, the training data processor may increase the local contrast of each image. By increasing the local contrast, or the contrast between the text and the background of the image, each text character may be easier to distinguish. The training data processor may use contrast limited adaptive histogram equalization (CLAHE) to increase the local contrast of the images. Binarization may be performed on the images and the local contrast of the images may be increased via other and/or additional methods without departing from embodiments disclosed herein.

In step 322, a skew correction is performed on skewed images in the training data.

In one or more embodiments disclosed herein, the training data processor of the information extractor may determine whether each image in the training data is skewed. In one or more embodiments, a skewed image may refer to an image that is aligned at a certain angle with the horizontal. To determine whether an image is skewed, the training data processor may project each image horizontally by taking the sum of pixels along rows of the image matrix to get a histogram of pixels along the height of the image to obtain a count of foreground pixels in every row. The image may then be rotated to various angles at small intervals of angles and the difference between the peaks of the foreground pixels before and after the rotation in a certain direction or the variance may be calculated. The angle, with respect to the horizontal at which the maximum difference between the peaks or the maximum variance is calculated, may be identified as the skew angle for the image. The training data processor may perform skew correction by rotating the image through an angle equal to the skew angle but in the opposite direction of the skew angle. Skew correction may be performed on skewed images in the training data via other and/or additional methods without departing from embodiments disclosed herein.

In step 324, trapezoidal correction is performed on trapezoidal images in the training data.

In one or more embodiments disclosed herein, when a document is not parallel to the scanner or camera, the captured image may include the Keystone effect. The Keystone effect may refer to a rectangular document may include a trapezoidal shape in an image. The Keystone effect may typically occur when capturing or scanning images using mobile phones or digital cameras. The training data processor of the information extractor may detect images in the training data that include trapezoidal shapes. The training data processor may then perform an affine transformation of the image to convert the trapezoidal image into a rectangle and then remove or delete edges of the image that do not include any useful data. Trapezoidal correction may be performed on trapezoidal images included in the training data via other and/or additional methods without departing from embodiments disclosed herein.

In step 326, noise removal is performed on the images to generate processed training data.

In one or more embodiments disclosed herein, the training data processor may perform noise removal on each image in the training data. The training data processor may divide each image into structure elements of a fixed size and shape. The binary images are then erodes and dilated using the structure elements and a noise removal technique is applied to the image to remove leftover small noise. Any appropriate noise removal technique may be used without departing from embodiments disclosed herein. By performing steps 310-324, the training data processor may transform the raw training data into processed training data. The processed training data may then be used by the image extractor to train the prediction model. Noise removal may be performed on the images to generate processed training data via other and/or additional methods without departing from embodiments disclosed herein.

In one or more embodiments disclosed herein, the method may end following step 326.

In one or more embodiments disclosed herein, the method of FIG. 3B may be performed on live data to generate processed live data.

Figure 3C:
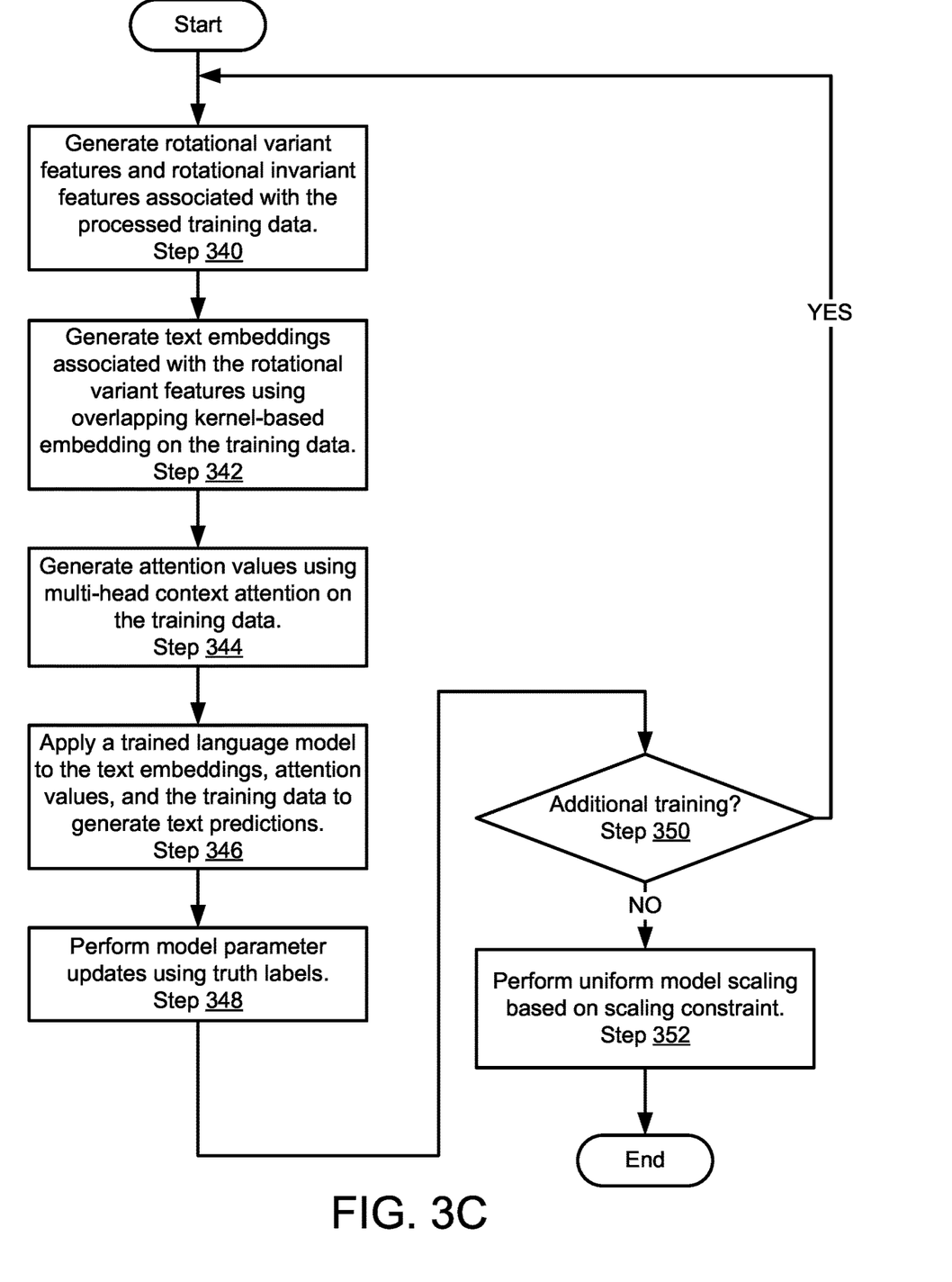
FIG. 3C shows a flowchart of a method for performing model training to generate a prediction model in accordance with one or more embodiments disclosed herein.

FIG. 3C shows a flowchart of a method for performing model training to generate a prediction model in accordance with one or more embodiments disclosed herein. The method may be performed by, for example, the extraction system (110, FIG. 1). Other and/or components of the system illustrated in FIG. 1 may perform all, or a portion, of the method of FIG. 3C without departing from the embodiments disclosed herein.

While FIG. 3C is illustrated as a series of steps, any of the steps may be omitted, performed in a different order, additional steps may be included, and/or any or all of the steps may be performed in a parallel and/or partially overlapping manner without departing from embodiments disclosed herein.

In step 340, rotational variant features and rotational invariant features associated with the processed training data are generated.

In one or more embodiments disclosed herein, the information extractor may generate rotational variant features and rotational invariant features associated with the processed training data by applying the processed training data to an initial prediction model. The initial prediction model may be a randomly generated CNN or a previously generated CNN generated in a previous training operation. The CNN may use rotational variant features for regressing bounding boxes and may use rotational invariant features for classification. The rotational variant features may be generated using active rotating filters (ARF). An ARF may convolve a feature map of an image with a canonical filter and its rotated clones to produce extra channels to incorporate richer rotation information associated with the image. The ARF may produce feature maps with orientation channels capturing rotation sensitive features and improving its generality for rotated samples. The rotational variant features may include bounded boxes of specifying coordinates of a portion of an image that may be associated that includes text. The rotational-invariant features may not be generated using ARF and rotated clones of images. The rotational-invariant features may include classifications whether an arbitrary region of the image includes the presence of text. A rotational feature map may be generated by pooling all the rotation sensitive features. The rotational variant features and rotational invariant features associated with the processed training data may be generated via other and/or additional methods without departing from embodiments disclosed herein.

In step 342, text embeddings associated with the rotational variant features are generated using overlapping kernel-based embedding on the training data.

In one or more embodiments disclosed herein, the text recognition portion of the CNN model may generate text embeddings associated with the rotational variant features using overlapping kernel-based embedding on the processed training data. Overlapping kernel-based embedding may include using kernels of a fixed size of pixels over the entire input image. As a result, text embeddings that may include a series of dimensional vectors associated with the kernels associated with the images along with the positional embedding (e.g., the coordinates or position of the kernels in the image) associated with the kernels may be generated. Using kernel based embedding may allow the model to use localized image information to generate more detailed embeddings for an image and may reduce the computation required for training. Each kernel may overlap with neighboring kernels. The use of overlapping kernels may reduce the information loss along the boundary regions of the patched image. This is particularly important when the patched size is small as in this case. The use of kernels may also bring the added flexibility of input image size not being tied to the pre-trained patch size as is the case with other solutions. The use of overlapping kernel based embedding may allow training of the model on much smaller dataset and achieve comparable performance of the bigger models with large parameters. Text embeddings associated with the rotational variant features may be generated using overlapping kernel-based embedding on the training data via other and/or additional methods without departing from embodiments disclosed herein.

In step 344, attention values are generated using multi-head context attention on the training data.

In one or more embodiments disclosed herein, the text recognition portion of the CNN model may generate attention values associated with the text embeddings using multi-head context attention on the processed training data. For each pixel associated with the text embeddings, an attention value may be generated using multi-head context attention. Each pixel may be associated with a query vector, a key vector, and a value vector. The key vector and the value vector may be limited to or otherwise associated with a neighborhood of the pixel. The neighborhood may refer to a group of surrounding pixels associated with the pixel that include a fixed size. For example, for a neighborhood that includes the fixed size of nine pixels oriented in a three by three grid, the query pixel may be the center pixel in the grid and may end up with nine key-value pixels included in the neighborhood. For a corner pixel, the neighborhood may be another three by three grid, but the query pixel may not be positioned in the center. The attention value may be generated by applying the softmax function to the query vector times the key vectors associated with the query vector divided by a scaling factor. The result of softmax function may be multiplied by the value vectors associated with the query vector. Multiple localized attention layers (e.g., multiple sets of attention values) may be generated using the same or varying neighborhood sizes. Attention values may be generated using multi-head context attention on the training data via other and/or additional methods without departing from embodiments disclosed herein.

In step 346, a trained language model may be applied to the text embeddings, attention values, and the training data to generate text predictions.

In one or more embodiments disclosed herein, the information extractor may apply a trained language model to the text embeddings, attention values, and the training data to generate text predictions. The text predictions may specify the locations of bounding boxes that include the coordinates of the images of the training data that include a line of text and the corresponding text values. The text values may include predicted alphanumeric characters shown in the images of the processed training data. The trained language model may be applied to the text embeddings, attention values, and the training data to generate text predictions via other and/or additional methods without departing from embodiments disclosed herein.

In step 348, model parameter updates are performed using truth labels.

As used herein, a truth label may refer to the true values of the text predictions. As a result, the truth labels may include the actual bounding boxes and the actual text values associated with the images included in the processed training data. In one or more embodiments disclosed herein, the information extractor may perform any appropriate model update using truth labels associated with the training data. As an example, the information extractor may generate a loss function using the truth labels and the text predictions. The information extractor may update one or more parameters associated with the CNN prediction model. The parameters may include the kernel size, the neighborhood size, layer weights and biases, etc. Other and/or additional parameters may be updated without departing from embodiments disclosed herein. Model parameter updates may be performed using truth labels via other and/or additional methods without departing from embodiments disclosed herein.

In step 350, a determination is made as to whether there is additional training.

In one or more embodiments disclosed herein, the information extractor may determine whether there is additional training based on a number of training epochs. The number of training epochs may specify the number of times a set of training data is to be used to train the prediction model. The client, user of the client, or other user may provide or otherwise specify a number of training epochs in the message that initiated the training in step 300 of FIG. 3A. The information extractor may keep track of the number of training epochs already performed (e.g., the information extractor may increment an epoch counter after each epoch). As disclosed herein, a training epoch may refer to one complete pass through the training data during training. Said another way, a training epoch is completed when every image in the training data is input into the prediction model. Multiple training epochs may be performed with different orders of different training batches including different images during training of the prediction model may be performed to improve prediction model accuracy and performance. In one or more embodiments disclosed herein, if the number of training epochs performed by the information extractor in training the prediction model is less than the number of training epochs provided by the client, then the information extractor may determine that there is additional training (e.g., may perform an additional training epoch). In one or more embodiments disclosed herein, if the number of training epochs performed is equal to the number of training epochs provided by the client, then the information extractor may determine that there is no additional training. The determination as to whether there is additional training may be made via other and/or additional methods without departing from embodiments disclosed herein.

In one or more embodiments disclosed herein, if it is determined that there is additional training, then the method may proceed to step 340 and steps 340-350 may be repeated. In one or more embodiments disclosed herein, if it is determined that there is no additional training, then the method may proceed to step 352.

In step 352, uniform model scaling is performed based on dimension scaling coefficients.

In one or more embodiments disclosed herein, the information extractor may perform a neural architecture search of the baseline prediction model (e.g., stored in the prediction model repository (146, FIG. 1)) to determine the relationship between different scaling dimensions of the baseline prediction model under a fixed resource constraint to determine the dimension scaling coefficient for each scaling dimension. The information extractor may then apply the dimension scaling coefficient for each dimension to each dimension to uniformly scale up or down the prediction model based on the resource constraint, a target model size (e.g., target dimensions, data size, etc.), and/or a computational limit (e.g., the amount of computing resources available to execute the prediction model). The scaling dimensions may include the depth, the width, and the resolution associated with the prediction model. The depth may refer to the number of layers in the prediction model. The width may refer to the number of neurons or the number of filters in each layer in the prediction model. The resolution may refer to the height and width of the input image. A scaling coefficient may include a factor that may be used to scale a dimension of the prediction model. The target model size, the fixed resource constraint, and/or the computational limit may be configured by a user of a client and provided along with the initiation of the training in step 300 of FIG. 3A. Uniform model scaling may be performed based on dimension scaling coefficients via other and/or additional methods without departing from embodiments disclosed herein.

In one or more embodiments disclosed herein, the method may end following step 352.

Figure 3D:
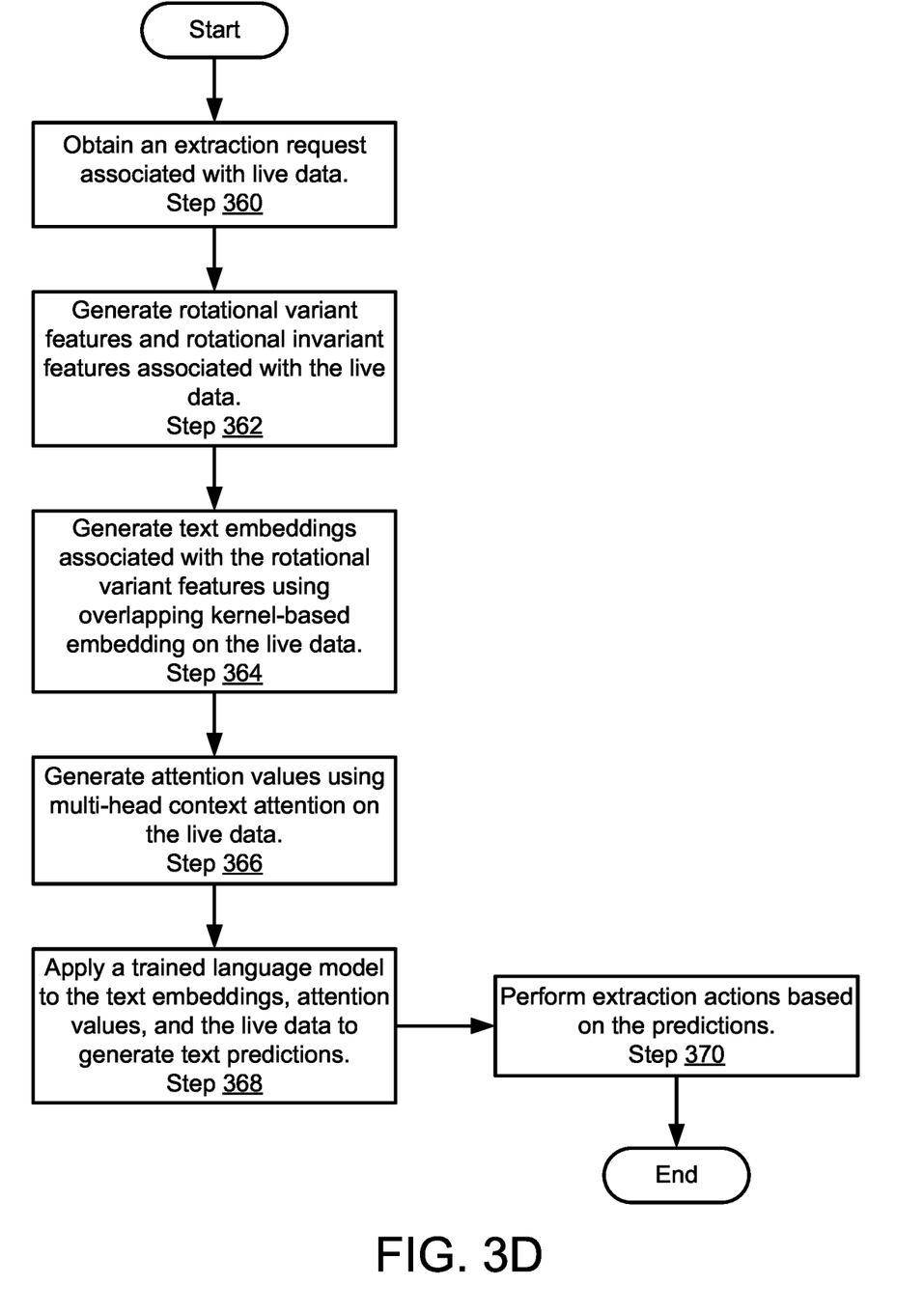
FIG. 3D shows a flowchart of a method for generating text predictions in accordance with one or more embodiments disclosed herein.

FIG. 3D shows a flowchart of a method for generating text predictions in accordance with one or more embodiments disclosed herein. The method may be performed by, for example, the extraction system (110, FIG. 1). Other and/or components of the system illustrated in FIG. 1 may perform all, or a portion, of the method of FIG. 3D without departing from embodiments disclosed herein.

While FIG. 3D is illustrated as a series of steps, any of the steps may be omitted, performed in a different order, additional steps may be included, and/or any or all of the steps may be performed in a parallel and/or partially overlapping manner without departing from embodiments disclosed herein.

In step 360, an extraction request associated with live data is obtained.

In one or more embodiments disclosed herein, the information extractor of the extraction system may obtain a message from a client. A user of the client may generate the message to send to the information extractor. The message may include a request to generate a text prediction associated with live data. The message may include the client identifiers that may specify the clients associated with the message. The message may further include the live data. The live data may include one or more image files. In one or more embodiments disclosed herein, the information extractor may perform processing on the live data to generate processed live data via the methods discussed above in FIG. 3B prior to continuing with step 362. The extraction request associated with live data may be obtained via other and/or additional methods without departing from embodiments disclosed herein.

In step 362, rotational variant features and rotational invariant features associated with the live data are generated.

In one or more embodiments disclosed herein, the information extractor may generate rotational variant features and rotational invariant features associated with the live data using the methods discussed above in step 340 of FIG. 3C as applied to the live data. The rotational variant features and rotational invariant features associated with the live data may be generated via other and/or additional methods without departing from embodiments disclosed herein.

In step 364, text embeddings associated with the rotational variant features are generated using overlapping kernel-based embedding on the live data.

In one or more embodiments disclosed herein, the information extractor may generate text embeddings associated with the rotational variant features using overlapping kernel-based embedding on the live data using the methods discussed above in step 342 of FIG. 3C as applied to the live data. The text embeddings associated with the rotational variant features may be generated using overlapping kernel-based embedding on the live data via other and/or additional methods without departing from embodiments disclosed herein.

In step 366, attention values are generated using multi-head context attention on the live data.

In one or more embodiments disclosed herein, the information extractor may generate attention values associated with the text embeddings using multi-head context attention on the live data using the methods discussed above in step 344 of FIG. 3C as applied to the live data. The attention values associated with the text embeddings may be generated using multi-head context attention on the live data via other and/or additional methods without departing from embodiments disclosed herein.

In step 368, a trained language model is applied to the text embeddings, attention values, and the live data to generate text predictions.

In one or more embodiments disclosed herein, the information extractor may apply a trained language model to the text embeddings, attention values, and the live data to generate text predictions. The text predictions may specify the locations of bounding boxes that include the coordinates of the images in the live data that include a line of text and the corresponding text values. The text values may include predicted alphanumeric characters shown in the images of the processed live data. The trained language model may be applied to the text embeddings, attention values, and the live data to generate text predictions via other and/or additional methods without departing from embodiments disclosed herein.

In step 370, extraction actions are performed based on the predictions.

In one or more embodiments disclosed herein, the information extractor may perform any extraction actions based on the predictions without departing from embodiments disclosed herein. The extraction actions may include, for example, sending the text predictions to the client associated with the extraction request, obtaining feedback from users of the client that specifies a number of errors, saving a copy of the live data and the feedback as new training data, determining to retrain the prediction model based on the number of errors and an error threshold, requesting additional training data from clients, retraining the prediction model, etc. After obtaining the text predictions, users of the client may perform further processing of the live data using the live data and text predictions. For example, users may satisfy purchase orders based on the text predictions. The extraction actions may be performed based on the predictions via other and/or additional methods without departing from embodiments disclosed herein.

As a result, the time it takes to process images may be reduced, the efficiency of processing the images may be improved, and human error associated with processing the images may be reduced.

In one or more embodiments disclosed herein, the method may end following step 370.

Figure 4:
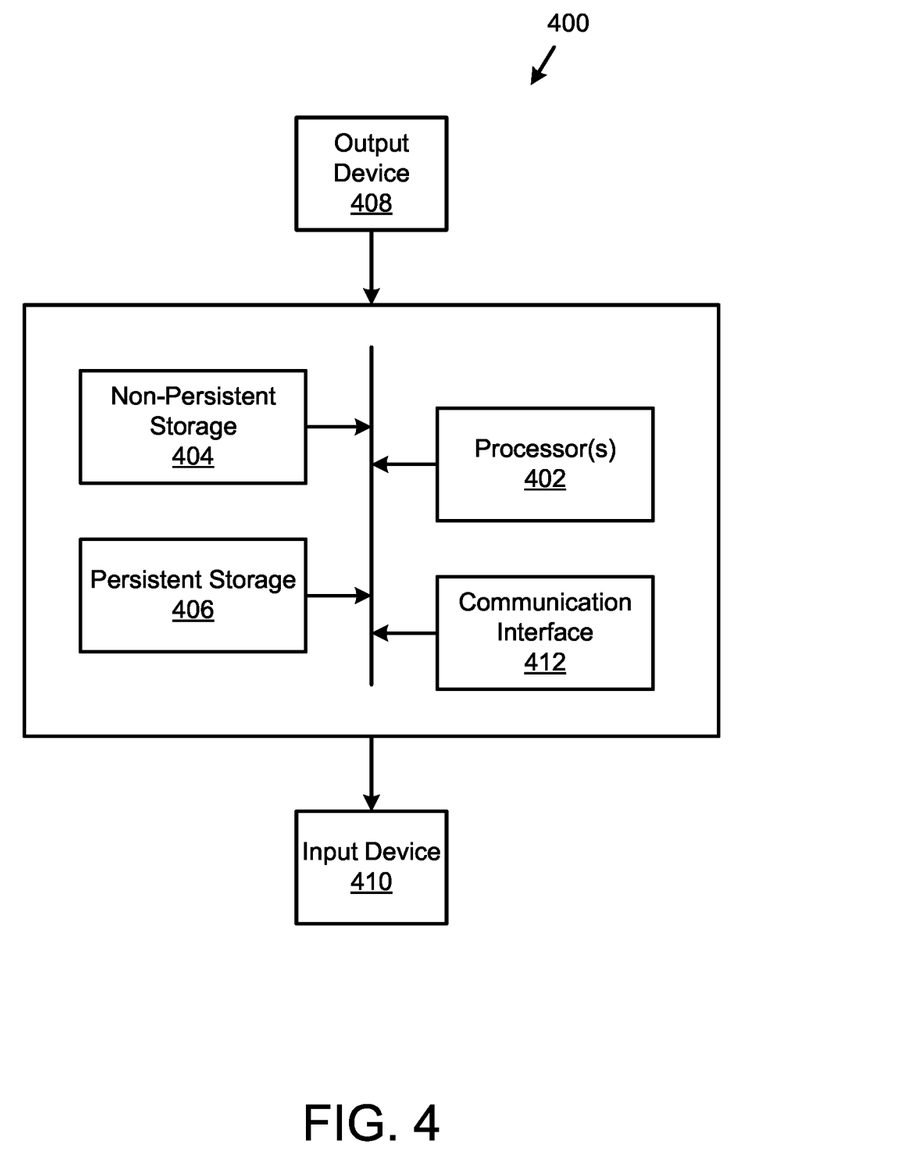
FIG. 4 shows a diagram of a computing device in accordance with one or more embodiments disclosed herein.

As discussed above, embodiments of disclosed herein may be implemented using computing devices. FIG. 4 shows a diagram of a computing device in accordance with one or more embodiments disclosed herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment disclosed herein, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

While the embodiments disclosed herein have been described with respect to a limited number of embodiments, those skilled in the art, having benefit of this disclosure, will appreciate that other embodiments can be devised which do not depart from the scope of the technology as disclosed herein. Accordingly, the scope of the embodiments disclosed herein should be limited only by the attached claims.

What is claimed is:

1. A method for extracting text information from images, comprising:
    obtaining an extraction request associated with live data comprising an image;
    generating, using a prediction model, rotational variant features and rotational invariant features associated with the live data;
    generating, using the prediction model, text embeddings associated with the rotational variant features using overlapping kernel-based embedding on the live data;
    generating, using the prediction model, attention values for each pixel in the live data using context attention;
    applying a trained language model to the text embeddings, attention values, and the live data to generate predictions; and
    performing extraction actions based on the predictions.

2. The method of claim 1, wherein the prediction model comprises a convolutional neural network.

3. The method of claim 1, wherein the rotational variant features comprise coordinates associated with text included in the live data.

4. The method of claim 3, wherein the rotational variant features are generated using active rotating filters.

5. The method of claim 1, wherein the rotational invariant features comprise classifications specifying whether portions of the live data include text.

6. The method of claim 1, wherein:
the text embeddings comprise overlapping portions of the live data; and
the overlapping portions of the live data comprise fixed dimensions.

7. The method of claim 6, wherein the text embeddings further comprise image embeddings and positional embeddings.

8. The method of claim 1, wherein using context attention comprises performing a softmax function for each pixel over a fixed-sized neighborhood of nearby pixels.

9. The method of claim 1, further comprising:
prior to obtaining the extraction request:
identifying a training event;
obtaining raw training data comprising images associated with the training event;
performing preprocessing on the raw training data to generate processed training data;
generating the prediction model using the processed training data; and
performing uniform scaling on the prediction model using a scaling constraint.

10. The method of claim 9, wherein performing preprocessing on the raw training data to generate processed training data comprises:
calculating variance associated with the images;
discarding low variance images from the images;
performing skew correction on the images; and
performing trapezoidal correction on the images.

11. A system for extracting text information from images comprises:
persistent storage for storing:
raw training data, and
processed training data; and
an extraction system, comprising a processor and memory, programmed to:
obtain an extraction request associated with live data comprising an image;
generate, using a prediction model, rotational variant features and rotational invariant features associated with the live data;
generate, using the prediction model, text embeddings associated with the rotational variant features using overlapping kernel-based embedding on the live data;
generate, using the prediction model, attention values for each pixel in the live data using context attention;
apply a trained language model to the text embeddings, attention values, and the live data to generate predictions; and
perform extraction actions based on the predictions.

12. The system of claim 11, wherein the prediction model comprises a convolutional neural network.

13. The system of claim 11, wherein the rotational variant features comprise coordinates associated with text included in the live data.

14. The system of claim 13, wherein the rotational variant features are generated using active rotating filters.

15. The system of claim 11, wherein the rotational invariant features comprise classifications specifying whether portions of the live data include text.

16. A non-transitory computer readable medium comprising computer readable program code, which when executed by a computer processor enables the computer processor to perform a method for extracting text information from images, the method comprising:
obtaining an extraction request associated with live data comprising an image;
generating, using a prediction model, rotational variant features and rotational invariant features associated with the live data;
generating, using the prediction model, text embeddings associated with the rotational variant features using overlapping kernel-based embedding on the live data;
generating, using the prediction model, attention values for each pixel in the live data using context attention;
applying a trained language model to the text embeddings, attention values, and the live data to generate predictions; and
performing extraction actions based on the predictions.

17. The non-transitory computer readable medium of claim 16, wherein the prediction model comprises a convolutional neural network.

18. The non-transitory computer readable medium of claim 16, wherein the rotational variant features comprise coordinates associated with text included in the live data.

19. The non-transitory computer readable medium of claim 18, wherein the rotational variant features are generated using active rotating filters.

20. The non-transitory computer readable medium of claim 16, wherein the rotational invariant features comprise classifications specifying whether portions of the live data include text.

* * * * *